(12) United States Patent
Chandra et al.

(10) Patent No.: US 10,621,298 B2
(45) Date of Patent: Apr. 14, 2020

(54) AUTOMATICALLY GENERATED SCHEMATICS AND VISUALIZATION

(71) Applicant: Synopsys, Inc., Mountain View, CA (US)

(72) Inventors: Anshuman Chandra, Sunnyvale, CA (US); Subramanian Chebiyam, Sunnyvale, CA (US); Rohit Kapur, Cupertino, CA (US)

(73) Assignee: Synopsys, Inc., Mountain View, CA (US)

( * ) Notice: Subject to any disclaimer, the term of this patent is extended or adjusted under 35 U.S.C. 154(b) by 562 days.

(21) Appl. No.: 15/335,263

(22) Filed: Oct. 26, 2016

(65) Prior Publication Data

US 2017/0116364 A1 Apr. 27, 2017

Related U.S. Application Data

(60) Provisional application No. 62/246,493, filed on Oct. 26, 2015.

(51) Int. Cl.
*G06F 17/50* (2006.01)

(52) U.S. Cl.
CPC .................. *G06F 17/5054* (2013.01)

(58) Field of Classification Search
CPC ..................................... G06F 17/5054
USPC ......................................... 716/102
See application file for complete search history.

(56) References Cited

U.S. PATENT DOCUMENTS

| | | | |
|---|---|---|---|
| 6,314,194 B1 * | 11/2001 | Michael | G06F 17/5045 250/559.34 |
| 2005/0278154 A1 * | 12/2005 | Abebe | G06F 17/5036 703/2 |
| 2006/0074938 A1 * | 4/2006 | Miller | G06F 17/505 |
| 2016/0110369 A1 * | 4/2016 | Cervelli | G06F 16/252 707/722 |

* cited by examiner

*Primary Examiner* — Suchin Parihar
(74) *Attorney, Agent, or Firm* — HIPLegal LLP; Judith Szepesi

(57) ABSTRACT

An automated visualization tool in a command line environment allows complex log data to be represented by symbols and associated information for clarity of communication and better understanding of the associated design.

20 Claims, 10 Drawing Sheets

```
============================================================
              Streaming Compression DPT Flow Information  302
304  DPT Flow:                                MII
306  Base scan mode:                          Internal_scan
308  Base scan mode chains:                   4
310  Base scan mode maximum shift length:     128

320  Compression mode maximum shift length:   40
322  Codec with maximum shift length:         sub
324  Codec shift penalty (codec/chain):       25%
326  Target input compression:                3.20X (w.r.t. Internal_scan)
328  Target output compression:               3.20X (w.r.t. Internal_scan)
============================================================
                                              300
```

FIG. 3

```
***************************************
1000
Preview_dft report
For   : 'Insert_dft' command          1005
Design : top
Version: K-2015.06-BETA
Date  : Thu May  7 11:14:59 2015
***************************************

***************************************
Current mode: Internal_scan           1014
***************************************
Number of chains: 4
Scan methodology: full_scan           1016
Scan style: multiplexed_flip_flop
Clock domain: no_mix
                                      1018
Scan chain '4' (SI1 --> SO1) contains 2 cells
  Active in modes: Internal_scan
Scan chain '1' (SI3 --> SO3) contains 128 cells
  Active in modes: Internal_scan
Scan chain '2' (SI2 --> SO2) contains 128 cells
  Active in modes: Internal_scan
Scan chain '3' (SI4 --> SO4) contains 128 cells
  Active in modes: Internal_scan

***************************************
Current mode: ScanCompression_mode 1052
***************************************
Number of chains: 15
Scan methodology: full_scan           1054
Scan style: multiplexed_flip_flop
Clock domain: no_mix Scan chain '7' contains 2 cells       1056
  Active in modes: ScanCompression_mode
Scan chain '1' contains 22 cells
  Active in modes: ScanCompression_mode
Scan chain '2' contains 22 cells
  Active in modes: ScanCompression_mode
Scan chain '3' contains 21 cells
  Active in modes: ScanCompression_mode
Scan chain '4' contains 21 cells
  Active in modes: ScanCompression_mode
Scan chain '5' contains 21 cells
  Active in modes: ScanCompression_mode
```

Scan chain '6' contains 21 cells
Active in modes: ScanCompression_mode

Scan chain 'sub_1' contains 32 cells
Scan chain 'sub_2' contains 32 cells
Scan chain 'sub_3' contains 32 cells
Scan chain 'sub_4' contains 32 cells          1058
Scan chain 'sub_5' contains 32 cells
Scan chain 'sub_6' contains 32 cells
Scan chain 'sub_7' contains 32 cells
Scan chain 'sub_8' contains 32 cells ScanDataIn Ports:
SI2
SI3                                           1060
SI4
ScanDataOut Ports:
SO2
SO3
SO4

******** Test Point Plan Report *******
Total number of test points  : 0
Number of Autofix test points: 0
Number of Wrapper test points: 0              1062
Number of test modes         : 0
Number of test point enables : 0
Number of data sources       : 0
Number of data sinks         : 0
***************************************

================================
Test Mode Controller Information
================================
Test Mode Controller Ports
--------------------------
test_mode: test_mode                          1064

Test Mode Controller Index (MSB --> LSB)
----------------------------------------
test_mode Control signal value - Test Mode
--------------------------------
0 Internal_scan - InternalTest
1 ScanCompression_mode - InternalTest

FIG. 10 (Prior Art)

AUTOMATICALLY GENERATED SCHEMATICS AND VISUALIZATION

RELATED APPLICATION

The present application claims priority to U.S. Provisional Application No. 62/246,493, filed on Oct. 26, 2015, and incorporates that application in its entirety.

FIELD

The present invention relates to circuit design, and more particularly to providing an improved interaction with circuit design tools including complex data analysis.

BACKGROUND

The process of building integrated circuits (ICs) is a multi-step process. The designer or design team initially has a purpose and an associated functionality for that purpose, for example, contained in a specification. The designer or design team then uses a computer aided design (CAD) tool to design logic structures to implement that functionality. These logic structures, as well as the wires connecting the logic structures, are referred to as one or more of the "design" and the "netlist". When completed, the netlist is manufactured, or "fabricated" in a foundry by building transistors using a semiconductor, such as silicon, resulting in an IC chip. The ICs produced by the foundry are then used in different systems and products.

When creating the design, more than just the functional aspect of the IC must be considered. Both the design process and fabrication are complex processes. For example, to ensure that the IC is manufactured correctly and functions as specified, additional logic is added to the design. This additional logic is called the "test logic" and the set of techniques to make ICs more testable are called design-for-test (DFT). In many design processes, the test logic is added to the design by a test engineer or test team, rather than by the designer or design team.

The netlist of the design by itself is very complex and becomes more complex with size. When further adding DFT test logic, the netlist becomes yet more complex, and therefore even more challenging. For the purposes of simplicity, reference to the design refers both to the design as it exists prior to the inclusion of DFT test logic and the design as it exists after the inclusion of DFT test logic. When managing various considerations for the design and test logic; for example, design size, transistor density, thermal management, and structural integrity; it is crucial that everyone involved with the DFT planning, design and test logic debugging, including both the design and test teams, has clear communications and a clear understanding of the design and changes to the design. Although graphical tools are available to support these tasks, the vast amount of information contained in the design and test logic can overwhelm and/or obscure details relevant to the proper functioning of the ICs for the teams managing these considerations.

FIG. 10 is an example prior art report 1000 for two scan modes for a simple circuit of 1000 flops. Report 1000 for the current mode 1014 which is an internal scan mode includes report header information 1005, summary information 1016 and scan chain information 1018. The summary information 1016 displays information that four scan chains were built and scan chain information 1018 lists the scan ports connected to each of the scan chains. Scan chain information 1018 also reports the length of these registers, and if enabled, has the capability to show all the flops in the verbose mode (not shown).

In operation, typically a user is not interested in a particular flop in the scan chain until a failure is recorded during pattern simulation. In such a situation, a tool such as the TetraMAX from Synopsys, Inc. identifies the failing flop in a chain using the diagnostic capability built into it.

Report 1000 for the current mode 1052 equivalent to Scan Compression mode includes summary information 1054, scan chain information 1056, sub scan chains 1058, in/out ports 1060, test point report 1062 and controller information 1064. For Scan Compression mode 1052, report 1000 is an example output for a tool similar to the DFTMAX Ultra from Synopsys, Inc. The report indicates that based on the current specifications, the associated tool will build 105 chains (in header information 1054) with a maximum length of 32 (max of lengths in scan chain information 1056 and sub scan chains 1058) and identifies the scan ports that will be used to build those chains (in/out ports 1060). Unfortunately, much information relevant to the user is not captured by this report.

While report 100 is a summary of a very simple circuit, it is easy to extrapolate the expanded difficulty to read and understand an equivalent report when it represents the output from a design with 100 k flops (1000 times more complex).

BRIEF DESCRIPTION OF THE FIGURES

The present invention is illustrated by way of example, and not by way of limitation, in the figures of the accompanying drawings and in which like reference numerals refer to similar elements and in which:

FIG. 3 is an exemplary ASCII character summary report in accordance with one embodiment of the present invention.

FIG. 10 is an exemplary output of a prior art EDA tool.

DETAILED DESCRIPTION

Figure 1:
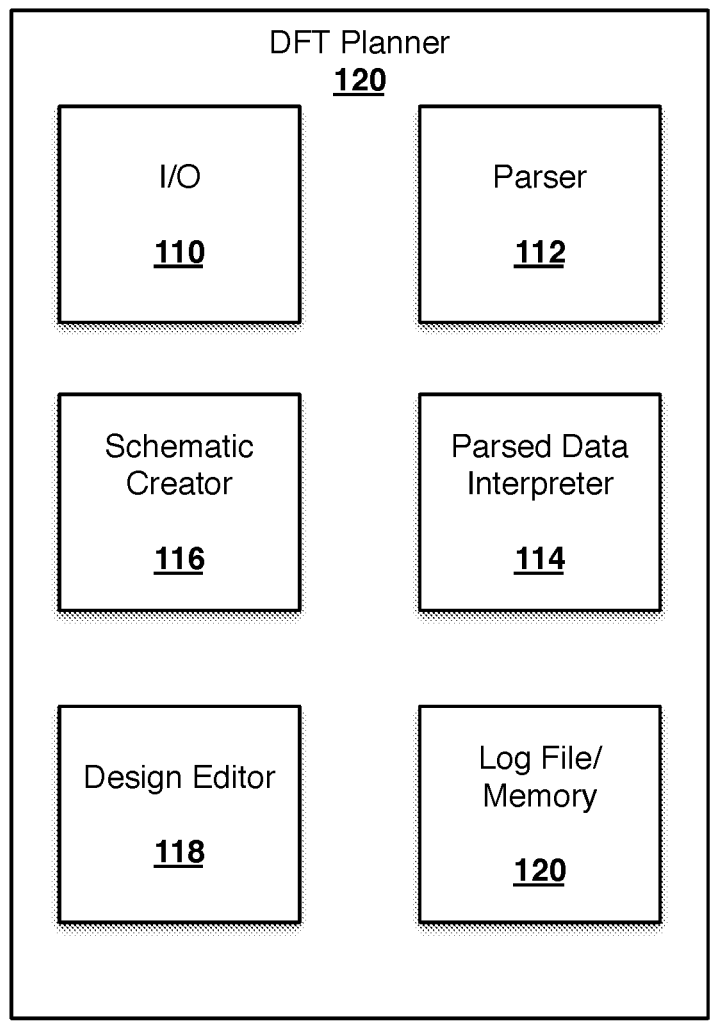
FIG. 1 is a block diagram of one embodiment of a DFT planner, showing how it fits in to the scan architecture code.

The visualization tool described automatically generates block diagram style schematics. In one embodiment, the schematics are ASCII, Unicode, or other character-based format. For simplicity, below, the application references ASCII-based displays. However, it should be understood that ANSI, Unicode, Shift-JIS or other character-based formats may be used in addition or in the alternative.

While designers and engineers are trained to design and discuss concepts in block diagrams, current generation output of analysis software shows the designs as netlist structures. Generating block diagrams in ASCII format enables the system to capture these in the log file itself without relying on a separate image file. This enables displaying design concepts that do not explicitly exist. The user can study and if needed, modify the specific structure(s) that will be eventually added to the design by the tool. Therefore it helps plan and improve the eventual implementation. The system is also useful in debugging and communication with remote teams. This is especially useful when working at a customer site, without remote machine access to run the test case with a debuggable tool executable.

The use of command line interface restrictions on the display of information, such as ASCII character based schematics, can be applied to any tool. However, for the purposes of illustration only and by way of example, these schematics are shown in DFT COMPILER™ manufactured by SYNOPSYS, INC.™. These type of schematics for the Synopsys, Inc. DFT COMPILER tool are called DFT Planner for DFT architecture sign off (DFT Planner). For ease of discussion, this Specification will refer to the set of things that may be displayed in a command line interface as "ASCII characters" and drawings and associated text using those characters as "ASCII schematics", as ASCII is the most common character set with this characteristic. It should be understood that other character sets and character mappings are contemplated, and thus the terminology should be interpreted as including Unicode character sets or any other language or character set available for display. Reference to ASCII and Unicode contemplate all of character sets available to display.

The system in one embodiment, is embedded in the core EDA code base and captures the implementation details in ASCII format that can be stored like a regular log file. The schematics are generated using the information stored in the tool code base and do not require extensive independent implementation needed for GUI based graphical files. This file can be easily shared with team members anywhere in the world and can accelerate debugging of issues by enabling effective communication.

The visualization tool presents structures in block diagrams that designers & engineers are very familiar with. In one embodiment, the tool associates specific shapes with specific functions/structures & help convey the concept easily & quickly. This helps the user to focus on the functionality to implement without getting confused with what is present in the design. In one embodiment, the visualization tool, in addition to displaying the design concept that is in existence in some subset of the design, gives user a scratch pad utility where they can quickly look at the structure of a particular design construct that will be implemented in a certain part of the netlist The visualization tool guides the user to understand the functionality to be implemented quickly and clearly before any netlist change is made. The resulting schematic can be embedded in the regressions & any changes occurring from one version of the tool to another can be quickly isolated. The schematic enables efficient debugging of implementation issues as only the relevant structures are shown based on the tool being used. In one embodiment, the visual tool enables a more efficient inter-team communication. It also provides a more compact display. Information that was captured earlier in 1000s of lines can now be captured in a very concise way within one or two pages. Because schematics are simple & intuitive to understand, there is no need for a user guide to start benefitting from the visualization tool.

FIG. 1 is a block diagram of one embodiment of a DFT planner, showing how it fits in to the scan architecture system. DFT Planner 100 contains an input/output module 110, a parser module 112, a parsed data interpreter 114, a schematic creator 116 and a design editor 118, and a log file/memory 120.

Within the flow of the IC design process, typically Design for Test (DFT) technology is implemented in one or more of the Register Transfer Level (RTL) or the Gate Level synthesis environments, although it can be implemented in other environments. For example, the Synopsys GUI tool Design Vision was originally created to support synthesis-based netlist representation and did not contain portions having a specific focus on test logic. The Design Vision tool displayed the contents of the netlist, meaning the current state of the design. Although the graphics generated by the Design Vision tool provide an informative representation of the design, the user experience may be improved by providing an alternative representation of a relevant subset of the design, especially with the rest of other sign off tools similar to test technology. One embodiment of the present invention has been implemented in the Design-for-Test (DFT) EDA tool DFTMAX Ultra platform from Synopsys Inc. as a "DFT Planner" tool.

Input information from input/output module 110 may be parsed with parser 112. This parsed data may be interpreted.

Schematic creator 116 creates the ASCII schematic. Using ASCII schematics enables the automatic generation of block diagram style schematics. In comparison to current graphical user interface (GUI) based solutions that are designed to work with the entire body of information available for the design and test logic, block diagram style schematics may be shown, for example, containing a subset of the design, a system or a subset of a system, or a subset of information that is contextually relevant.

As noted above, a schematic representation may be created from near overwhelming information represented by thousands of lines in a log file, resulting in the information being displayed in a very clear and simple way. In one embodiment, the relevant subpart may be shown in one or two pages based on the design size. Using carefully chosen representations, the schematics can be very simple and intuitive to understand, so that in many cases a user guide is not needed to understand the schematic. Additionally, schematics are scalable to extend to other technologies in addition to test logic, such as timing, power, design planning and synthesis based structures within sign off tools, RTL based tools including the verification platform, and others.

In one embodiment, the ASCII schematic solution allows the creation and display of design concepts that do not exist within the design. Similarly, in one embodiment, the present invention allows displaying the design concept that is in existence in some subset of the design. In a way a user is provided with a scratch pad utility where they can quickly look at the structure of a particular design construct that may be implemented in a certain part of the netlist. Since the user can visually see what functionality they are implementing as this shows up either on their screen or a log file, they can quickly check if this matches what they had in mind or not. If not, they can make changes by issuing new commands and refresh the schematic. In one embodiment, what they see in the schematic is just a figure and nothing is implemented in the netlist.

In one embodiment, ASCII schematics are generated for one or more relevant subsets of the design, e.g. power structures or test structures. In one embodiment, ASCII schematics are generated for only the new design structures that will be added to the netlist or for altered design structures. GUI based solutions present detailed information about elements that are presently in the design. In contrast, the ASCII schematics may show only the relevant subset of structures. In one embodiment, ASCII schematics may be drawn in the block diagram style that is familiar to a wide variety of people, including designers and test engineers, which is illustrated in FIGS. 2-6 below.

Existing GUI displays depict logic that is already present in the netlist, and are not designed to filter out information based on the current tool usage and the user specifications. To implement a new functionality in the design, the tool asks the user to specify certain commands and options to guide the tool in designing and implementing a particular feature or functionality in the existing design. This is received by the input module. As a result, the information is provided in a way that is hard to consume as it is much more information than is needed to perform the task at hand. The GUI tools are generally designed with a global view in mind. It is not that they cannot be precise, but since the GUI implementation is done by a different team and the feature implementation is done by a different team, the GUI is designed to be more general to handle all kinds of scenarios. With ASCII schematics, the implementation team itself is responsible to select the feature or functionality that they are developing. Since they are the people who are most knowledgeable about this, they are able to display specific things that they know the user will be interested in and avoid showing less relevant information.

Input/output module 110 may provide the schematic and associated data to a user, such as via a display or printout. When a user does not wish to share a design, but still desires assistance with issues, for example with the EDA tool implementation, using the prior art data set it was a big challenge to achieve quick turnaround in addressing issues and ensure customer satisfaction. Using the techniques of DFT Planner, the issues with the test implementation can be resolved without reviewing or addressing the entire design, using only the requirements and information in the log file. While functional design engineers and test design engineers have different specialties, both groups are familiar with schematics. Therefore, test engineers are able to communicate ahead of time during the design cycle about possible test implementations and the prerequisites needed in the design to adequately support DFT implementation.

For example, a design may display a design concept such as a parity tree. This parity tree can be shown in several ways: the various implementations utilizing XOR gates, or a distributed set of elements that it is not easily visualizable. However, in one embodiment, if the logic behavior identified from the relevant set of elements or XOR gates is determined to behave like a parity tree, then the set of elements or XOR gates can be replaced in the display with a block diagram or conceptual schematic that is identifiable as a parity tree. When the actual implementation of the logic isn't relevant to the actions the user wishes to perform, but a generic representation of the function will be sufficient, then one embodiment of the present invention shows the generic representation of the function, for example, in ASCII schematics.

Design editor 118 enables the user to interact with the interpreted design to make changes and possibly save those changes to memory 120, or externally through input/output module 110.

An efficient and focused way to address and review changes made to the netlist is presented. In one embodiment, information contained in the design and test logic relevant to changes to the netlist or operations of the IC is shown, and irrelevant information is minimized or eliminated. In one embodiment, structures shown are those related to current tool usage. In one embodiment, structures shown are related to the user specifications. In one embodiment, potential design changes are represented in the structures shown in addition to structures present in the design. In one embodiment, only information that can be represented in a command line interface is presented. In one embodiment, the command line interface highlights relevant portions of the design by displaying simple ASCII character based schematics. By using only information that can be represented in a command line interface, the system allows log file capture of results of operations and changes to the design including the test logic, and in one embodiment improves response and interaction time by allowing users to utilize a keyboard instead of requiring mouse-based interaction.

In one embodiment, the visualization using the ASCII schematics of the DFT Planner is very closely tied to the actual implementation code. The DFT Planner is implemented such that limitations in the API don't limit the information that may be shown. In one embodiment, code that a particular team is not responsible for managing or changing is abstracted or is not shown. For example, in some embodiments only code that is controlled by that team, or is editable by that team, is shown using ASCII schematics. In other embodiments, code that the team is not responsible for managing or changing but that may impact code that they are responsible for are shown as abstracts that are not editable. For example, in some instances its not possible to show the code of other teams to developers in other teams or to customers. When those other teams change their code, it causes the design netlist to change. This may/may not cause the DFT implementation to also change based on the specifications to be the same. For example, in the design for top level logic in FIG. 2, there are 128 sequential cells and the tool builds 6 chains with two chains of length 22 and remaining four chains of length 21. Now say in the latest release the synthesis team optimized their code and the new netlist has only 127 sequential cells. This will cause the planner output to have 1 chain of length 22 and five chains of length 21. This is very easy to see on the schematic. Also if the user is diffing the old and new logs, they will spot it very quickly. So the effect of code changes by other teams can be caught quickly.

In this way, context in the overarching design may be described. In some embodiments, the effects or changes made are shown using ASCII schematics are shown in both the code that is controlled by the team and any other code that is impacted by those effects or changes. We describe this via the example of implementation in the DFTMAX Ultra platform from Synopsys, Inc. below.

Before test compression became commonplace, the DFT Compiler tool offered by Synopsys, Inc. was used to insert scan based test structures in the netlist. Scan based tests gather sequential elements together and stitch them into one or more shift registers, called scan chains, during test mode. When the designs were small, simple reporting of both the contents of these scan chains and the ports that they were connected to was all the information that the user needed. Over time, hierarchical test and scan compression techniques were developed to handle more complex designs, allowing the test of larger chips in shorter time with lower costs. As the effective time to design an IC became shorter, time taken and cost associated with test applications became even more important. Unfortunately, traditional tool reporting capabilities have fallen behind and are completely out of sync with the current needs surrounding the development of customer designs and implementation of scan compression within a hierarchical test environment. Traditional tools still report the information as it has been reporting ago. Traditional tools fail to report many crucial pieces of information that could help the user plan and design a better test architecture. Use of the visual system described leads to better DFT implementation and possibly better Automatic Test Pattern Generation (ATPG) Quality of Results (QoR).

In one embodiment, the system described may be utilized for debugging and communication with remote sites. In practice it is often the case that widely distributed users, sometimes at different companies, have to work together. Frequently, some of the users will want to limit the information that is shared, such as limiting access to the design or limiting to a remote machine access to run a test case for the relevant subportion of the design using a test tool as opposed to a design providing all of the relevant information. In one embodiment, the only information that is made available are log files from the previous runs rather than the detailed design.

Utilizing a log file that contains a snapshot of the relevant information about the design as well as the features that the user is trying to implement expedites the debugging process significantly, without requiring disclosure of the full design. Similarly, when international teams are interacting, using a log file that contains a snapshot of the relevant information about the design as well as the features that the user is trying to implement can limit misunderstandings that can occur from language, technology, or other differences.

Log file/memory 120 stores the data. In one embodiment, displaying local design concepts that will be added in the design provides the ability to make changes to the design before saving changes into the memory 120, and potentially impacting other functions or other teams. Any netlist has many different design elements, or aspects of the design, such as power structures, synthesis changes, and functional logic. Current GUI methods attempt to display all of the structures and constructs that exist.

Figure 2:
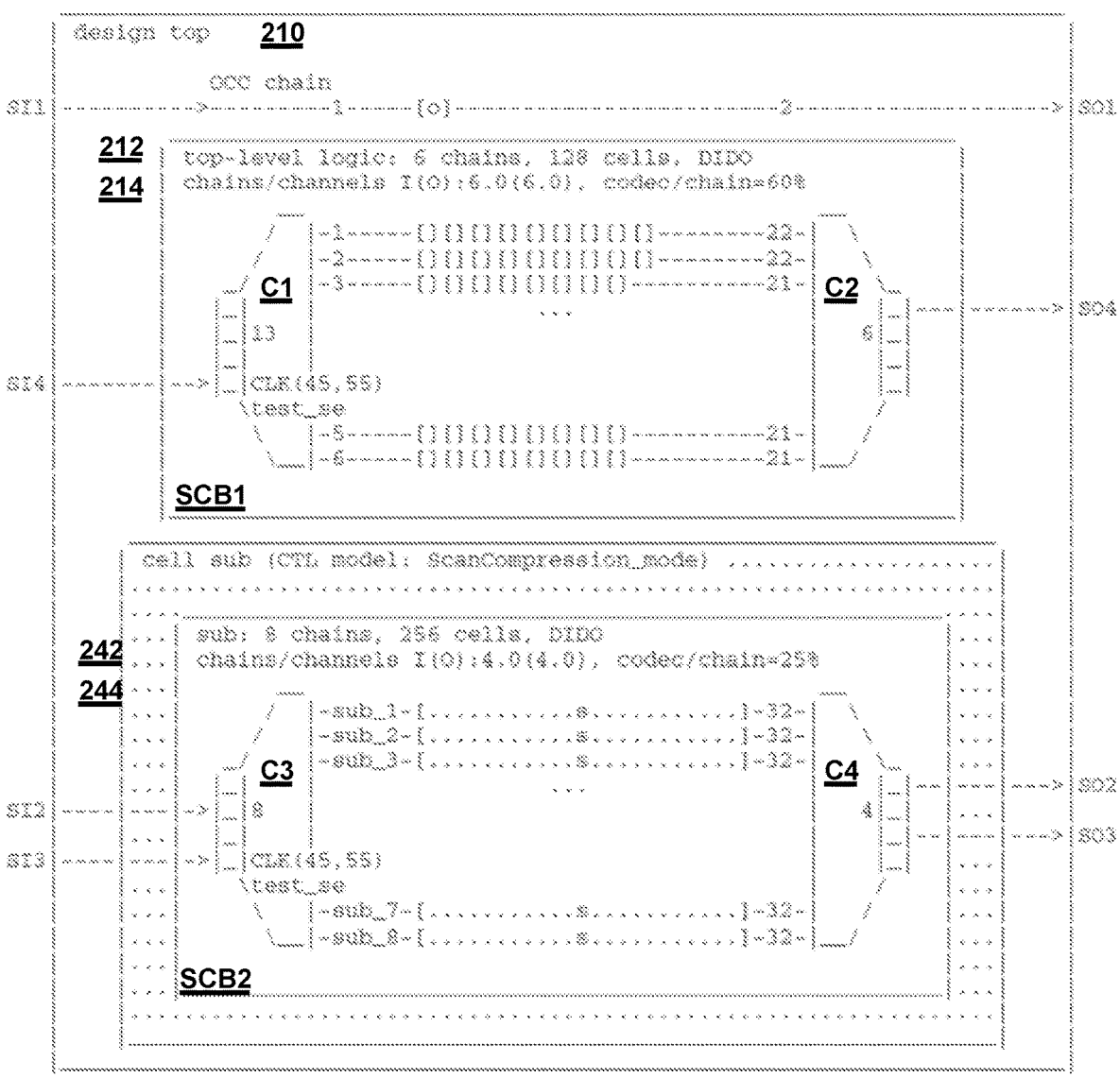
FIG. 2 is an exemplary ASCII schematic in accordance with one embodiment of the present invention.

FIG. 2 is an ASCII schematic which may be generated in accordance with one embodiment. This schematic may be output by a DFT Planner. Schematic 200 contains a design reference 210 two scan compression blocks, SCB1 and SCB2. SCB1 depicts inserting the logic for the top-level and building the scan chains to connect them to the compression structures. SCB2 depicts a hierarchical test block called sub that is frozen, meaning the details within the block are not editable. This block is integrated at the design top level. SCB1 and SCB2 are an example of a mixed insertion and integration (MII) flow. Schematic 200 shows scan ports, scan inputs SI1-SI4 and scan outputs SO1-SO4, which are connected to compression structures C1-C4. As shown, the connections between scan ports and compression structures is immediately visually apparent. For example, codec scan input SI4 is applied to decompressor C1. Schematic 200 shows the codec scan enable signal test_se, the codec clock CLK and the codec clock timing information (rise, fall) (45, 55). As only one clock is shown, the decompressor clock and the compressor clock are the same clock.

Chains/channel ratio for input 212, 242 and output 214 and 244 are shown for each scan compression block, including the codec/chain ratio. Decompression compression structures C1 and C3 display their decompressor serial register length per input (13 and 8, respectively), their associated compressed scan chain numbers (1, 2, 3, . . . , 5, 6 and sub_1, sub_2, sub_3, sub_7, sub_8, respectively). Each of the compressed scan chain numbers have an associated compressed scan chain length, for example compressed scan chain number 6 has a scan chain length of 21. In one embodiment, the length of compressed scan chain numbers have a scan chain length displayed relative to each other. For example, compressed scan chain number 1 has a scan chain length of 22, represented by a length of brackets that is longer than the representation of scan chain number 6, which is shorter. Compressor compression structure C2 and C4 show the compressor serial register length per output (6 and 4, respectively).

In one embodiment, information not previously available, but relevant to test compression structures, is provided. For example, in schematic 200, additional information available includes the signals driving each codec IP, the internal shift register lengths in the codec structures, the ratio of scan chain length to the codec chain length, the compression ratio with respect to the input and output, and the DFT architecture dedicated-input-dedicated-output (DIDO) being implemented.

Schematic 200 also shows that there is one scan chain SI1 that is dedicated to the on-chip clocking (denoted as OCC chain) and the associated ports driving that chain, SI1 to SO1. Although some of this information is present in the preview_dft report, it is presented as text, and is not easy to understand the function from the dispersed information in that report. Other schematics may contain more, less, or different information as is appropriate or required by the user.

The use of an ASCII schematic in one embodiment displays the design structures in block diagrams. In one embodiment, specific shapes within the block diagrams may be associated with specific functions and/or structures that can help convey the design element being depicted. This helps the user to focus on the new or updated functionality that is being added, without getting confused with what is already present in the design. For example, during DFT test logic insertion, a user can quickly identify what DFT structures are being added by viewing the specific shapes displayed in the ASCII schematic, as opposed to taking time reading and processing the log file to obtain similar information. Usually the user is confronted with choices that are given to the user for implementation. For example, the total area that the DFT engineer can add to the existing design could be a maximum of 4%, a fixed number of input and output ports, placement of hierarchical blocks, etc. So from the top level, he or she needs to plan and budget for these resources as to stay within these parameters. The user also can budget and plan DFT architecture without worrying about design elements such as existing synthesis and power structures in the design that are not impacted, or irrelevant to the current, new, or updated functionality.

FIG. 3 is an exemplary summary report that is associated with the schematic of FIG. 2, in one embodiment. Summary report 300 captures information that may be useful for the user to evaluate the current implementation, as well as modify the implementation if necessary. As shown in summary report 300, relevant information includes report context 302, flow type 304, scan mode 306, base scan mode chains 308, and base scan mode max shift length 310, actual shift length 320, codec with max shift length 322, codec shift penalty 324, target input compression 326 and target output compression 328.

In one embodiment, the summary report 300 includes information that the actual shift length 320 for this DFT architecture is 40, which is calculated by adding the scan chain length (32) to the codec shift register length (8). In the prior art, these numbers had to be found by combing the log report. Therefore, the user will know whether the automatic test equipment (ATE) length desired by the user can be supported without changes to the DFT implementation, instead of implementing the ATE length and finding out via a failed test or having to find that information and calculate it themselves. Other reports may contain more, less or different information, as is appropriate or required by the user.

Beneficially, the output of the system may be an ASCII (or other character-based) graphic which can be captured in log files; the internal structures, the contents, of streaming compression cores, including external chains, may be easily understood.

In one embodiment, scan chains in the schematics are sized relative to their length so their relative sizing is immediately visually indicated. With relative sizing of scan chains, the user may adjust the architecture to balance the shift latency across codecs, cores, external chains, etc., to maximize Automatic Test Pattern Generation (ATPG) efficiency. Additionally, in one embodiment, the system allows the DFT configuration to be changed and run/rerun as many times as needed until the user is satisfied with the architecture.

Further, in one embodiment, the visualization code is tied to the actual scan architecting code, allowing very small overhead in terms of memory and runtime. Unlike existing tools such as Design Vision, the user need not maintain a very heavy data structure and complex code to generate graphical images. Additionally, it is in an environment which the implementation engineer is familiar with, and is in control of when everything is handled in the shell environment.

Figure 4:
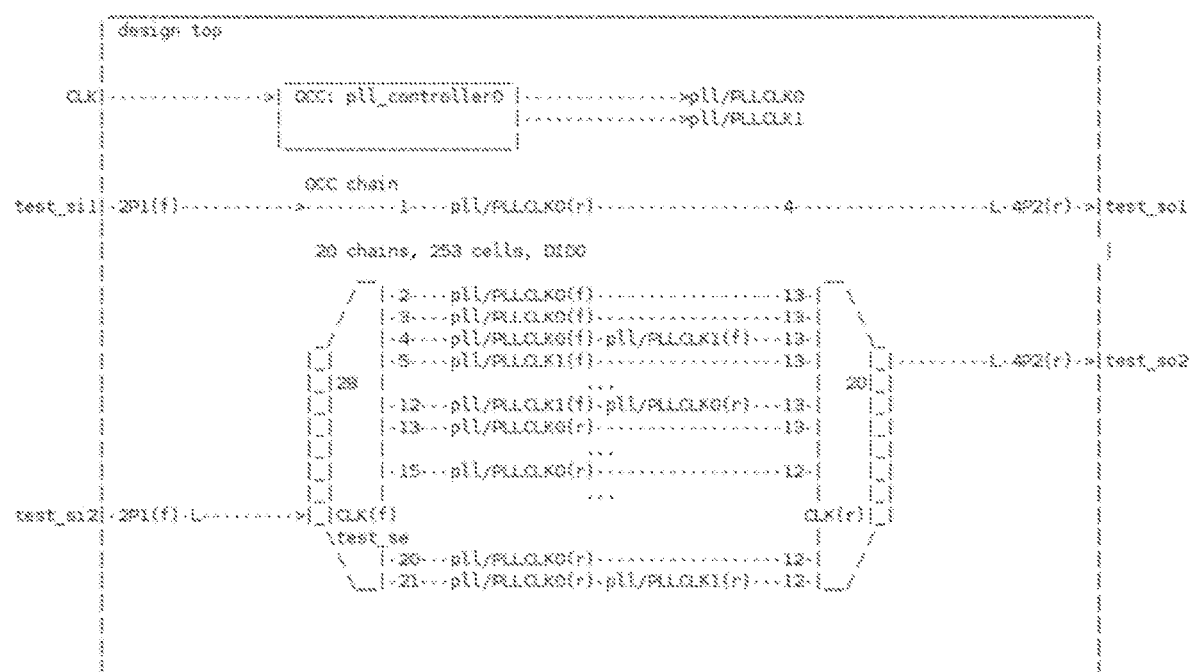
FIG. 4 is an exemplary ASCII schematic in accordance with one embodiment of the present invention.

FIG. 4 is an exemplary output ASCII schematic in accordance with one embodiment of the system as embodied in a tool such as DFT Compiler for a small design, for example, the DFTMAX Ultra DFT Planner product for Synopsys, Inc. This DFT Planner output shows top down insertion (TDI) flow showing overlapping clock timing, OCC controller with 2 pll_clocks, and independent pipeline clocks used with abbreviations P1 and P2.

Figure 5:
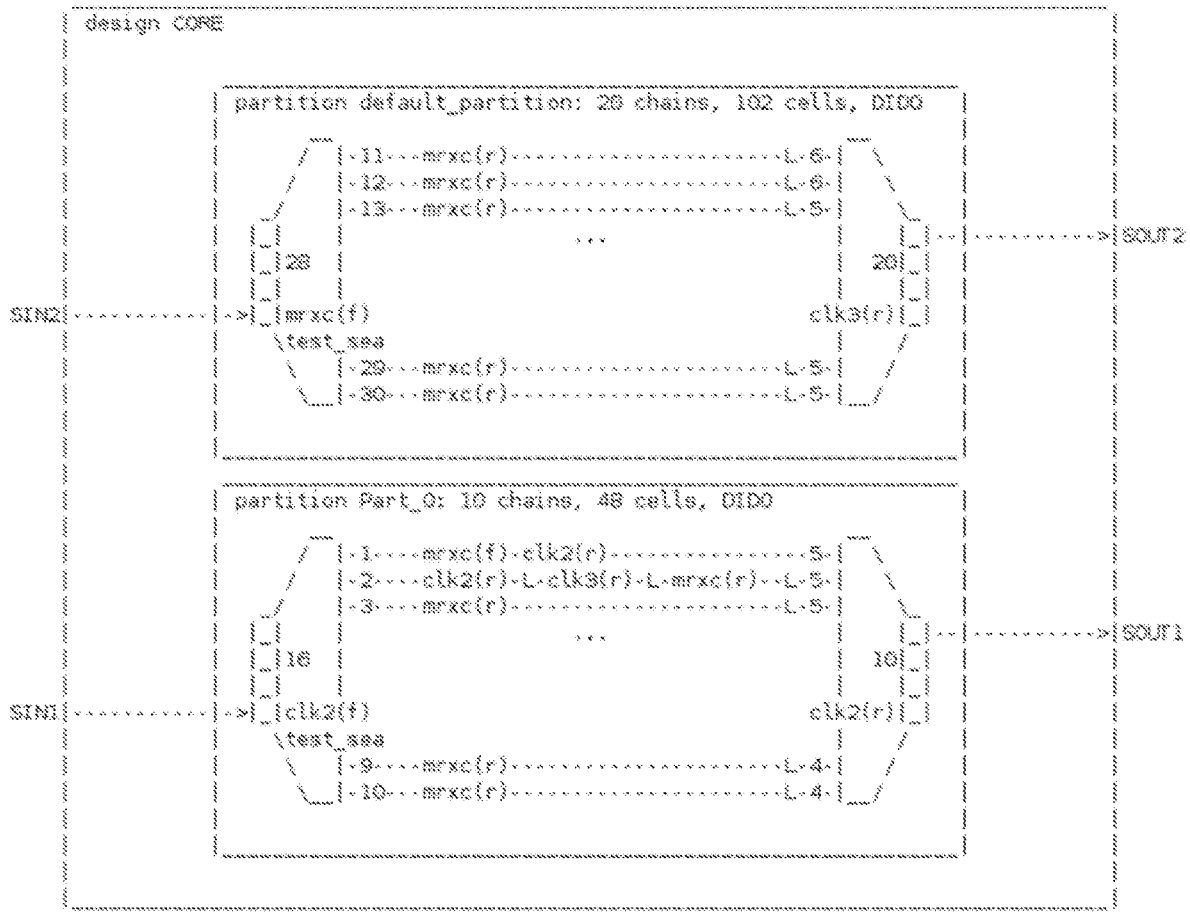
FIG. 5 is an exemplary ASCII schematic in accordance with one embodiment of the present invention.

FIG. 5 is an exemplary output ASCII schematic in accordance with one embodiment of the system as embodied in a tool such as DFT Compiler for a small design, for example, the DFTMAX Ultra DFT Planner product for Synopsys, Inc. This DFT Planner output shows the user the unnecessary lockup latches being inserted on the output side. In fact the user can avoid inserting 29 lockup latches (L-5 and L-4) by specifying the compressor clock as mrxc.

Figure 6:
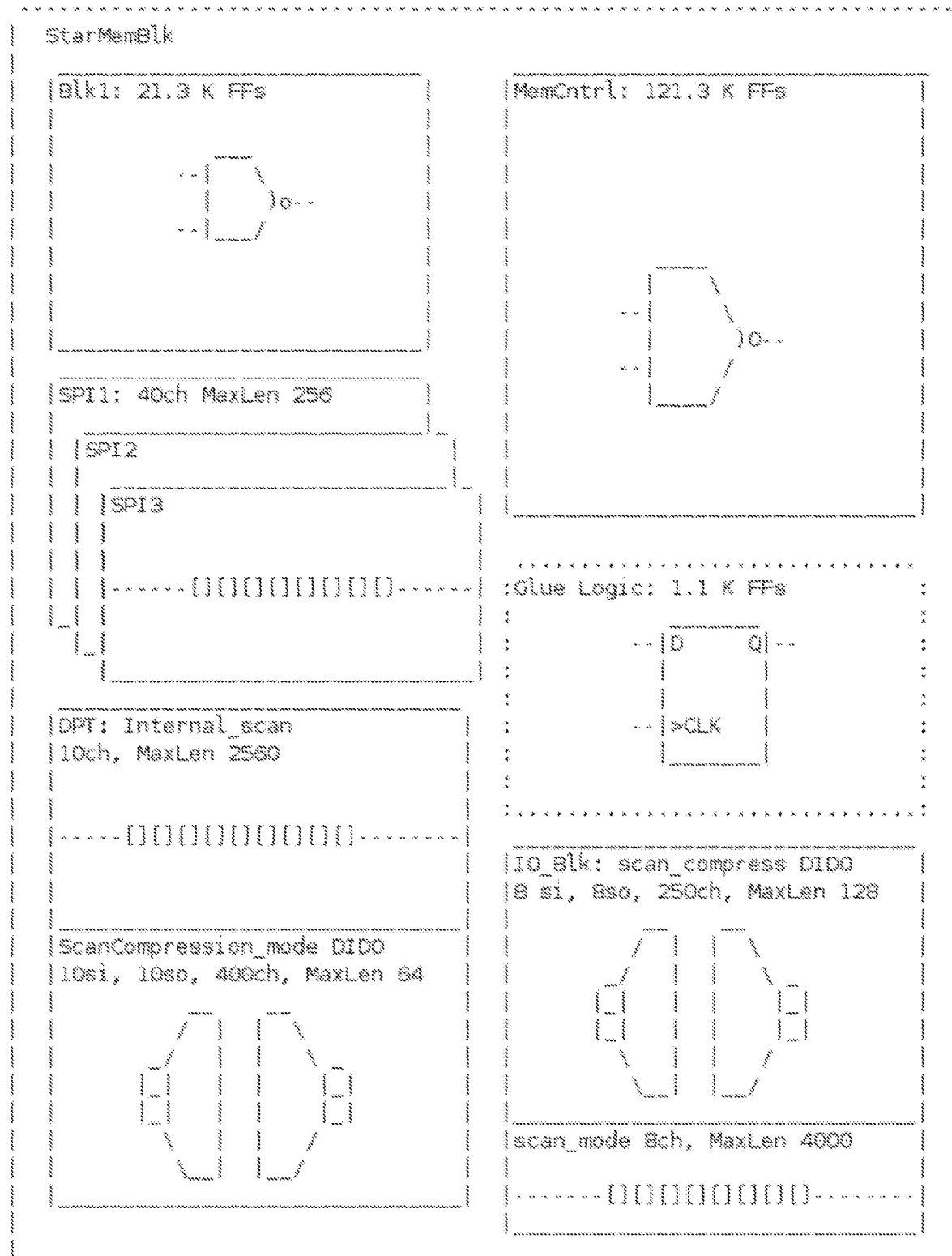
FIG. 6 is an exemplary ASCII schematic in accordance with one embodiment of the present invention.

FIG. 6 is a set of exemplary schematic elements in accordance with one embodiment of the system as embodied in a tool such as DFT Compiler for a small design, for example, the DFTMAX Ultra DFT Planner product for Synopsys, Inc. Exemplary representations of the relevant structures within the design are displayed along with their function. As shown in the figure, even before the structures shown in the schematic are implemented in the netlist, the system can show the user the current state of the design with respect to DFT insertion.

Figure 7:
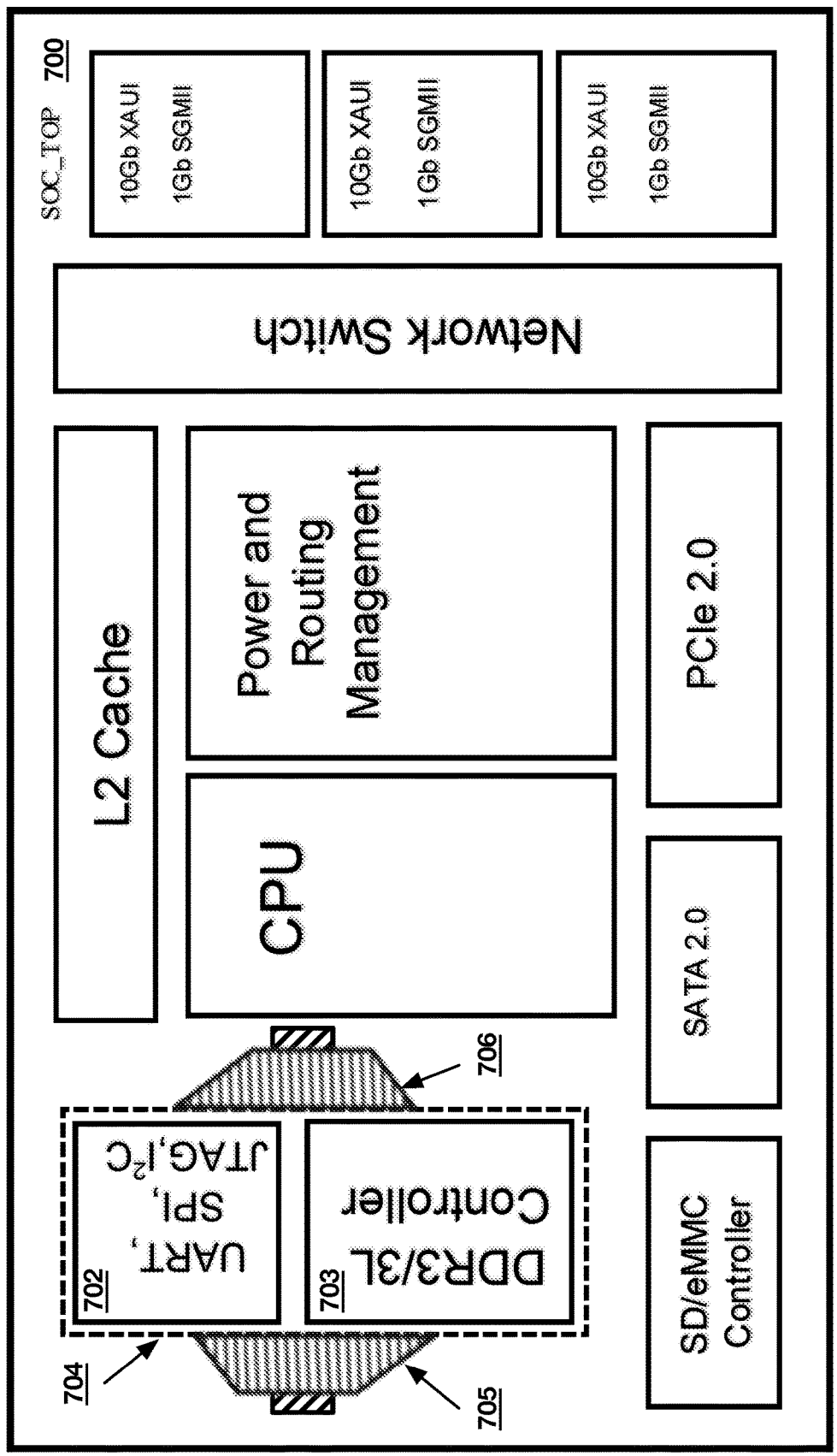
FIG. 7 is a chip layout in accordance with one embodiment of the present invention.

FIG. 7 is a block diagram of one embodiment of a layout of a system-on-a-chip. System on a chip 700 includes two pre-designed IP cores 702 and 703. In this embodiment, they are tested together into bundle 704, for example, to save time and space on the chip. Decompressor 705 and compressor 706 represent structures that may be displayed as parts of a visual schematic, to identify test information, such as scan chains.

Figure 8:
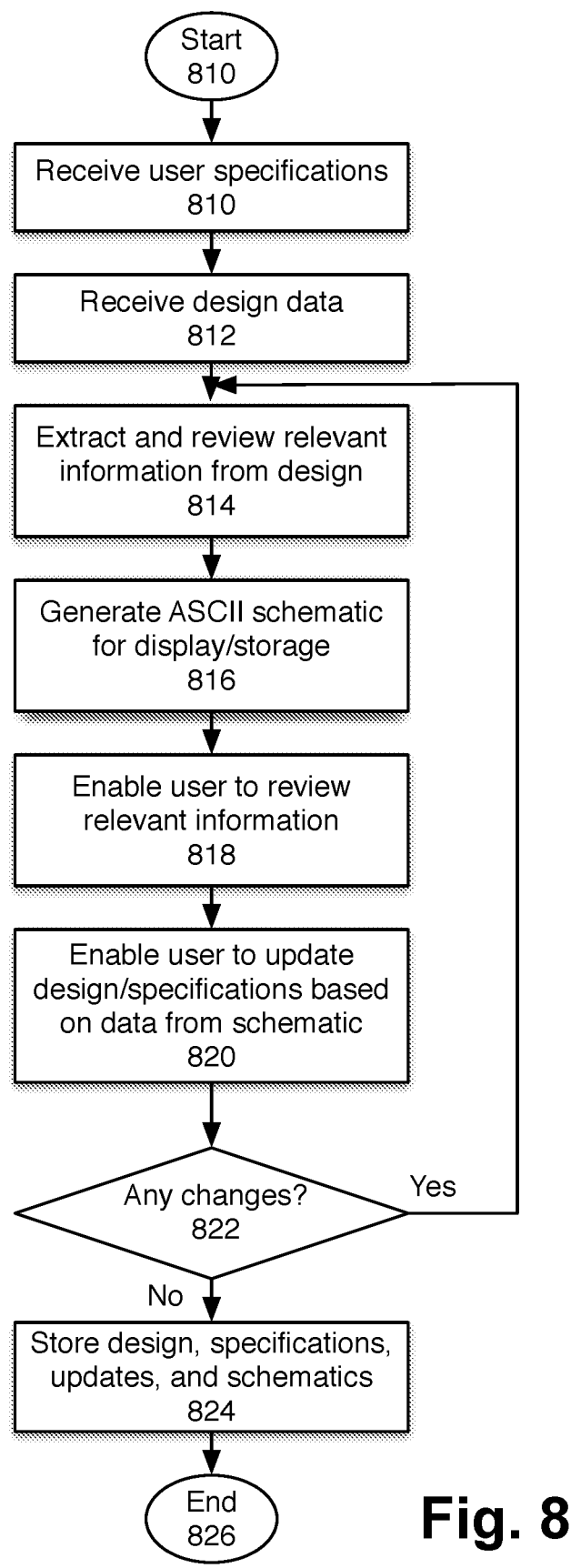
FIG. 8 is a flow chart in accordance with one embodiment of the present invention.

FIG. 8 is a flow chart of one embodiment of the visual schematic system, in accordance with one embodiment. The process begins with receipt of one or more of user specifications 810 and a circuit designs 812. The user specifications 810 are inputs to the tool from the user. These are specifications for the elements and/or functionality the user would like to add to the design. For example, the specification for FIG. 2 would be to build 1 OCC chain, 1 top level codec with 1 input/output and 6 chains, and integrate one compressed core that is frozen with 2 input/output and 8 chains. Based on these specifications, the tool will first show the schematic of how it will look. If the user choses to go ahead, this is what will be added to the netlist with the next command like insert_dft.

The system identifies the relevant information in the design at block 814. The relevant data is the portion of the data that is being analyzed for this system. The relevant information is then extracted. In one embodiment, this may include obtaining data from other systems.

At block 816, an ASCII schematic of the relevant information is generated. This data may be displayed, or stored, or both. In one embodiment, displayed information in step 816 is displayed on a computer monitor. In one embodiment, displayed information in step 816 is displayed in a printout. Information that is displayed to the user, enabling the user to review it, at block 818. If changes are warranted, the appropriate design or user specifications may be updated by the user at block 820.

At block 822, the process determines whether any changes were made to the design or specifications. If so, the process returns to block 814, to extract and review relevant information to generate an updated schematic. The updated information may be re-displayed or stored at block 818. When there are no further changes, the design, specifications, updates, and schematics are stored at block 824. In one embodiment, the data is stored in a log file within the analytics system. This means that no additional programs are required for reviewing the schematic, and data, and it is easily shared. The process then ends at block 826.

Figure 9:
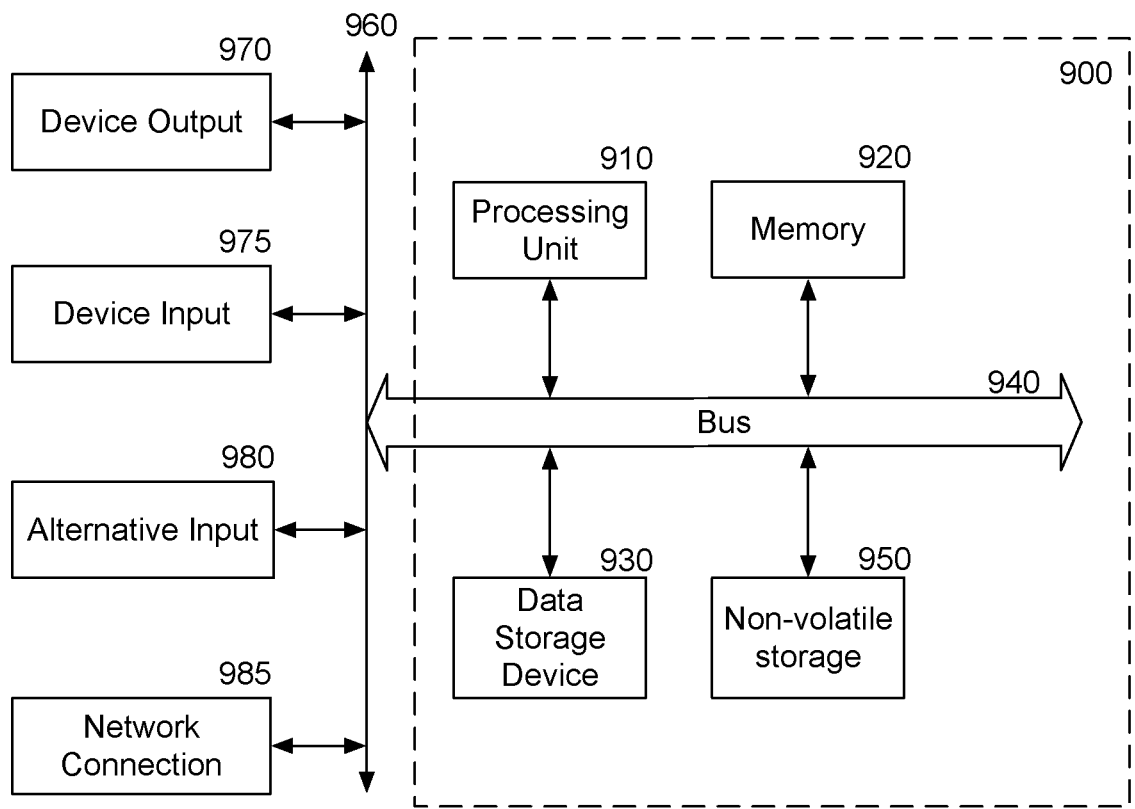
FIG. 9 is a block diagram of one embodiment of a computer system that may be used with the present invention.

FIG. 9 is a block diagram of one embodiment of a computer system that may be used with the system. It will be appreciated by those of ordinary skill in the art that any configuration of the particular machine implemented as the computer system may be used according to the particular implementation. The control logic or software implementing the system can be stored on any machine-readable medium locally or remotely accessible to a processor. A machine-readable medium includes any mechanism for storing information in a form readable by a machine (e.g. a computer). For example, a machine readable medium includes read-only memory (ROM), random access memory (RAM), magnetic disk storage media, optical storage media, flash memory devices, or other storage media which may be used for temporary or permanent data storage. In one embodiment, the control logic may be implemented as transmittable data, such as electrical, optical, acoustical or other forms of propagated signals (e.g. carrier waves, infrared signals, digital signals, etc.).

Using the specifications given by the user, the DFT Planner tool generates a comprehensive view of the DFT architecture to be implemented, and may provide that view within the log file associated with that tool. Advantages of the DFT Planner tool include:

allowing a user to understand the test functionality to be implemented quickly and clearly before any netlist change is made;

ease of embedding the schematic within regression tests quickly isolating changes that have been made;

efficient debugging when only the structures relevant to the tool being used and the specification from the user are shown; and use of an easily accessible schematic or block diagram enables more efficient communication, such as cut and paste of a screen shot or providing a log file.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

We claim:

1. A method for integrated circuit (IC) design comprising:
   upon receipt of a file, parsing the file for data related to structures associated with requirements for the IC design;
   creating a command-line controlled schematic of the structures and requirements, where the structures of the schematic are created as visual block diagrams and the visual block diagrams are depicted by ASCII characters; and
   displaying the schematic including the structures and the requirements described in an abstracted context of the IC design.

2. The method of claim 1, further comprising:
   receiving a user specification, the user specification including the requirements.

3. The method of claim 1, further comprising:
   selecting a subset of the structures of the IC design for inclusion in the schematic.

4. The method of claim 1, wherein the schematic is a block diagram representing one or more structures, including data about functionality of the one or more structures displayed in a combination of data and visual representation.

5. The method of claim 1, further comprising enabling modifying of the integrated circuit (IC) using the command line interface.

6. The method of claim 5, further comprising:
   rerunning the method, upon receiving the modification, to generate an updated schematic depicted by ASCII characters.

7. The method of claim 1, further comprising:
   storing the schematic depicted by ASCII characters in a log file; and
   sharing the log file.

8. The method of claim 1, further comprising:
   selecting a subset of the structures for presentation in the schematic based on relevance based on the requirements.

9. The method of claim 1, further comprising:
   selecting a subset of the structures for presentation in the schematic, the subset being a portion of the IC design that the user is responsible for.

10. A system for integrated circuit (IC) design comprising:
    a processor implementing a parser to, upon receipt of a file, parse the file for data related to structures associated with requirements for the IC design;
    a schematic creator to create a command-line controlled schematic of the structures and requirements, where the structures are generated as visual block diagrams and the visual block diagrams are depicted by ASCII characters; and
    a display to display the schematic including the structures and the requirements described in an abstracted context of the IC design.

11. The system of claim 10, further comprising:
    receiving a user specification, the user specification including the requirements.

12. The system of claim 10, further comprising:
    a design editor to select a subset of the structures of the IC design for inclusion in the schematic.

13. The system of claim 10, wherein the schematic is a block diagram representing one or more structures, including data about functionality of the one or more structures displayed in a combination of data and visual representation.

14. The system of claim 10, further comprising:
    the design editor to enable modifying of the integrated circuit (IC) using the command line interface.

15. The system of claim 14, further comprising:
    the system, upon receiving the modification, to generate an updated schematic depicted by ASCII characters.

16. The system of claim 10, further comprising:
    a log file/memory to store the schematic in a log file; and
    the system to enable sharing the log file.

17. The system of claim 10, further comprising:
    a parsed data interpreter to select a subset of the structures for presentation in the schematic based on relevance based on the requirements.

18. The system of claim 10, further comprising:
    the system to select a subset of the structures for presentation in the schematic, the subset being a portion of the IC design that the user is responsible for.

19. A method of generating an improved display comprising:
    receiving user specifications;
    receiving design data;
    generating a schematic for display to a user, the schematic representing at least a portion of the design data, where the structures are generated as visual block diagrams and the visual block diagrams are depicted by ASCII characters;
    displaying the schematic to a user, the graphically representing information about the design data; and
    enabling the user to update one or more of the user specifications and the design data, based on the schematic.

20. The method of claim 19, wherein the schematic is displayed as ASCII characters in a command-line interface.

* * * * *